R. T. BOWNE.
Cultivator.
No. 198,563. Patented Dec. 25, 1877.
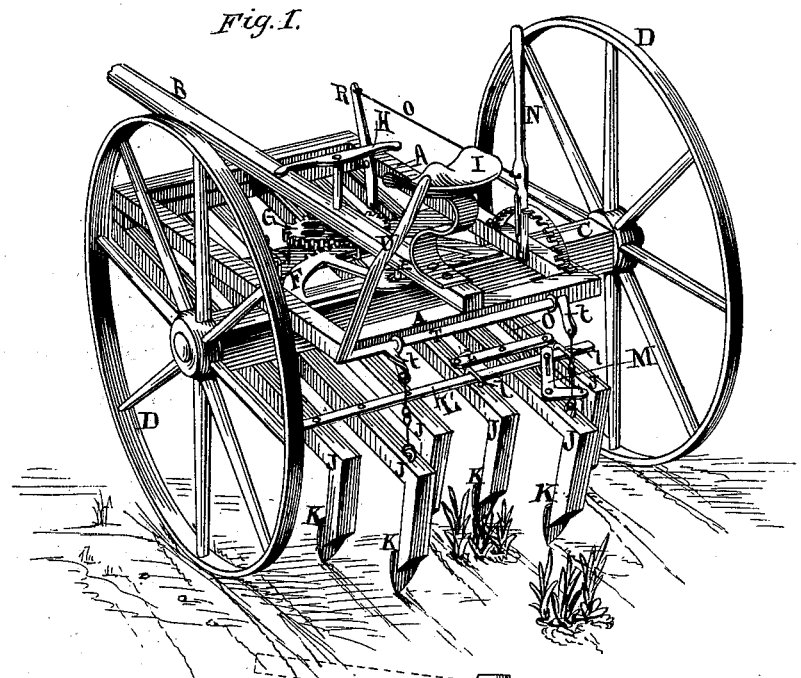
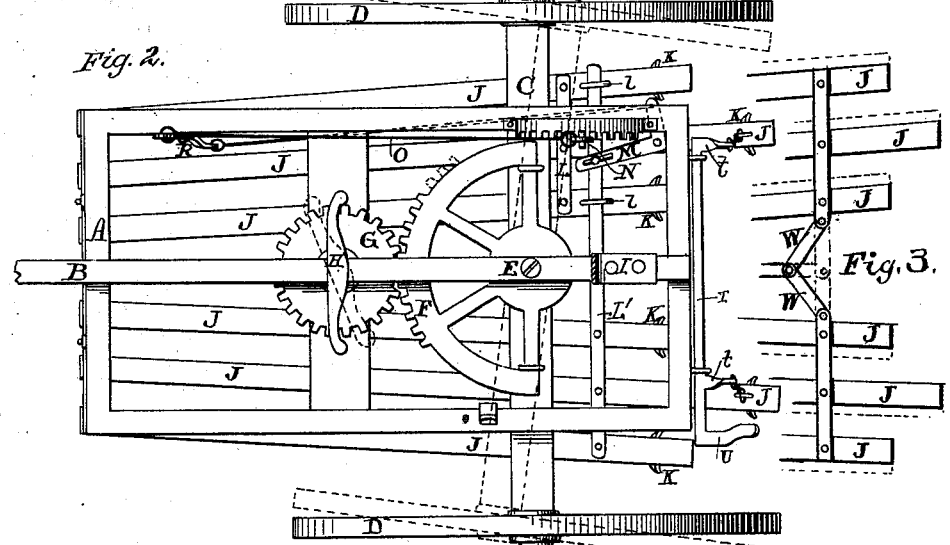
WITNESSES:
C Clarence Poole
D. P. Cowl
INVENTOR:
Robert T. Bowne
By his atty.
R. D. O. Smith
N. PETERS, PHOTO-LITHOGRAPHER, WASHINGTON, D. C.

UNITED STATES PATENT OFFICE.

ROBERT T. BOWNE, OF FALLSTON, MARYLAND.

IMPROVEMENT IN CULTIVATORS.

Specification forming part of Letters Patent No. 198,563, dated December 25, 1877; application filed November 20, 1877.

*To all whom it may concern:*

Be it known that I, ROBERT T. BOWNE, of Fallston, Harford county, Maryland, have invented new and useful Improvements in Cultivators; and that the following is a full and clear description of the same, reference being had to the accompanying drawing, wherein—

Figure 1 is a perspective view of my machine. Fig. 2 is a plan of the same. Fig. 3 shows a modification in the mode of controlling the drag-bars.

This invention relates to that class of cultivators known as "sulky" or "riding" cultivators, because they are provided with seats, whereon the driver can sit while the machine is in operation; and it consists, particularly, first, in the devices for controlling and shifting the angular position of the axle, so as to incline the wheels toward the right or left, and cause the machine to move aside correspondingly; second, in the simultaneous lateral adjustment in opposite directions of the groups of cultivators running on opposite sides of the row of plants.

That others may fully understand my invention, I will more particularly describe it.

A is an ordinary rectangular frame of wood, to the front and rear bars of which tongue B is secured for guidance of the machine, by the attachment of the front end of the tongue to the necks of the horses. C is the main axle, mounted on the wheels D D. The axle is connected to the frame A by a pivotal or king bolt, E, so that the angular position of said axle, as respects the frame, may be varied, and, as a consequence, the planes of the wheels may be rendered more or less oblique to the line of advance. This oblique adjustment of the wheels is useful to carry the machine bodily toward the right or left, as may be necessary, to clear any obstruction in its path, or to cause it to avoid any plant or plants a little out of the line of the row. It is also particularly useful when the machine is advancing along a slope of ground. The inclined position and weight of the machine and its driver then exerts a constant tendency to cause the machine to be deflected or to slide down hill. To correct this tendency the wheels are adjusted a little oblique to the line of progression, and the machine thereby caused to climb or move upward along the slope just to the extent that gravity causes it to move downward, and, between the two opposing forces, the machine is maintained in its true course.

In order to control the angular position of the axle, I place upon it a toothed segment, F, and mount upon the frame A smaller segment or pinion G, the shaft or axis of which is provided with a cross foot-bar, H, so that the driver, while upon his seat I, may rest his feet against said cross-bar and guide the machine as it advances. The drag-bars J J are attached at their front ends to the front bar of the frame A, or to a bar located beneath said front end. These drag-bars are jointed to said front bar, so that they may swing freely from side to side at their rear ends, or so that they may be raised up at their rear ends for facility of transportation. At the rear end of each drag-bar there is a standard and shovel, K.

The drag-bars and their attached shovels are arranged in two groups, so as to travel on each side of a row of plants and cultivate the soil on each side thereof, and the members of each group are attached to each other, so as to remain at fixed relative distances, while the groups themselves may be moved laterally in either direction, as may be required.

In the drawings each group is shown to be composed of three members, fastened together by rigid straps L L'. The strap L' is elongated, so as to extend over the opposite group, to which it is only connected loosely by means of staples *l*, through which said strap passes, permitting it to slide freely. A bell-crank lever, M, is located upon the rear end of the center drag-bar, and is connected with the strap L' by means of a slot and pin, so that as said bell-crank is moved upon its axis the strap L' will be moved in the staples *l*, and the groups of drag-bars caused to approach or recede, according to the direction of said movement.

The bell-crank lever M is operated by means of a hand-lever, N, and suitable connecting-rods O. In the arrangement shown in the drawings an intermediate lever, R, is also employed. The hand-lever N is also provided with a holding-rack, S, to retain it in any desired position.

When the machine is being transported from place to place, the cultivator-shovels should be raised from the ground; and to so raise them, I have attached a shaft, T, with projecting arms $tt$, to the rear end of the frame A, and suspend the groups of drag-bars separately, by means of rods or chains, from said arms $t$. A handle, U, is attached, also, to the shaft T, so that at will the driver can raise all the drag-bars from the ground. A latch, V, is attached to the frame A, to hold said lever when depressed.

In operation, as hereinbefore described, the oblique adjustment of the wheels may be resorted to in the general advance of the machine, to carry the cultivators from side to side, in accordance with the usual irregularity of the row of plants, and also to counteract the force of gravity while traversing the side of sloping ground. It may also be advantageously resorted to at the ends of the rows. When it becomes necessary for the horses to begin to turn aside, the machine may still be carried straight forward by the oblique adjustment of the axle, and, therefore, the rows may be worked more closely to the ends or to the fence than is practicable with other machines, when, as will frequently happen, the plants are straggling, so that a wider space than usual is required between the shovels. Then, by a motion of the lever N, the groups of shovels are separated, and, by a reverse movement, are brought together again when the occasion has passed. Thus the shovels of this machine may be run much closer to the plants than others which do not possess the power of expansion and contraction.

It is evident that the separate groups of drag-bars may be coupled and controlled, in the manner described, in a variety of ways, as, for instance, by a toggle, W, jointed at each end to one of said groups, and controlled at its center-joint by a hand-lever, as shown in Fig. 3. I therefore do not limit myself to the mechanism shown to produce the described relative adjustment of said several gangs or groups.

Having described my invention, what I claim as new is—

1. In a straddle-row cultivator, two gangs or groups of drag-bars, each provided with a cultivator-tooth, coupled together by a link rigidly secured to one group and movably attached to the other, and operated by a hand-lever, so that the driver may at will cause said groups to recede from or approach each other, as set forth.

2. The gangs or groups of drag-bars, each provided with a cultivator-tooth, connected together by a link rigidly attached to one group and movably attached to the other, combined with the slotted bell-crank M, connecting-rod O, and hand-lever N, whereby the driver can shift the relative positions of said groups at will.

3. The main frame, provided with a seat and separate gangs of cultivator drag-bars and their teeth, and a main axle, C, pivoted to said frame, combined with the toothed segment F and pinion G, geared thereto, and a double foot-lever, H, attached at its center to the pinion-spindle, so that the driver, while sitting upon his seat, can rest his feet upon said lever, and thereby control and guide the apparatus.

ROBT. T. BOWNE.

Witnesses:
JOHN T. SPICER,
JOHN GORDON.